(12) United States Patent
Chang et al.

(10) Patent No.: US 11,835,822 B1
(45) Date of Patent: Dec. 5, 2023

(54) COLOR TUNABLE OPTICAL DEVICE

(71) Applicants: Ting-Jia Chang, Taipei (TW); En-Chieh Lin, Taipei (TW); Xin-Hung Chen, Taipei (TW)

(72) Inventors: Ting-Jia Chang, Taipei (TW); En-Chieh Lin, Taipei (TW); Xin-Hung Chen, Taipei (TW)

(*) Notice: Subject to any disclaimer, the term of this patent is extended or adjusted under 35 U.S.C. 154(b) by 0 days.

(21) Appl. No.: 18/091,929

(22) Filed: Dec. 30, 2022

(30) Foreign Application Priority Data

Jul. 29, 2022 (TW) .................................. 111128680

(51) Int. Cl.
*G02F 1/13363* (2006.01)
*G02F 1/1335* (2006.01)

(52) U.S. Cl.
CPC .. *G02F 1/133638* (2021.01); *G02F 1/133528* (2013.01)

(58) Field of Classification Search
CPC ........... G02F 1/133528; G02F 1/13363; G02F 1/133634; G02F 1/133631; G02F 2413/01; G02F 2413/00; G02F 2413/06; G02F 2413/11; G02B 5/3083
See application file for complete search history.

(56) References Cited

U.S. PATENT DOCUMENTS

| 5,751,385 A | * | 5/1998 | Heinze | G02F 1/13473 349/97 |
| 2021/0263346 A1 | | 8/2021 | Sharp | |
| 2021/0323409 A1 | * | 10/2021 | Izutani | B32B 17/10036 |

* cited by examiner

*Primary Examiner* — Mariam Qureshi
(74) *Attorney, Agent, or Firm* — Muncy, Geissler, Olds & Lowe, P.C.

(57) ABSTRACT

A color tunable optical device electrically connects to a driving power source, and includes a first polarizer, a liquid crystal layer, a phase retarder and a second polarizer. The first polarizer converts a first mixed light into a first polarized mixed light. The liquid crystal layer is located behind the first polarizer and electrically connected to the driving power source for changing an arrangement direction of liquid crystal cells of the liquid crystal layer, and receives the first polarized mixed light. The phase retarder is located behind the liquid crystal layer to generate a second polarized mixed light. The second polarizer is located behind the phase retarder, and a second mixed light is generated by changing an incident angle of the second polarized mixed light incident on the second polarize, wherein a color of the second mixed light is different from that of the first mixed light.

4 Claims, 3 Drawing Sheets

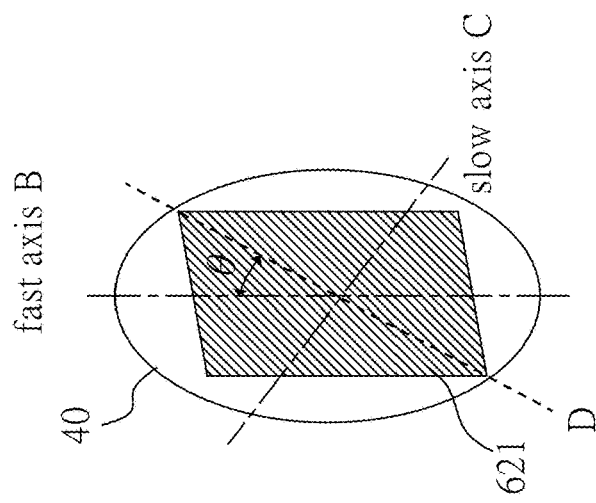
FIG. 3C
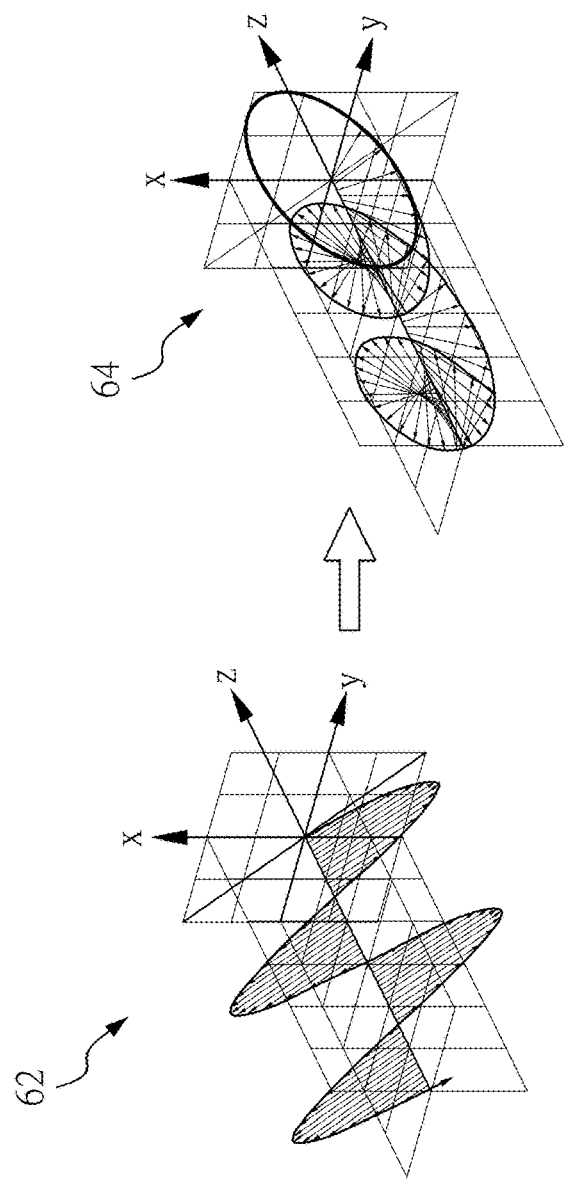
FIG. 3B
FIG. 3A

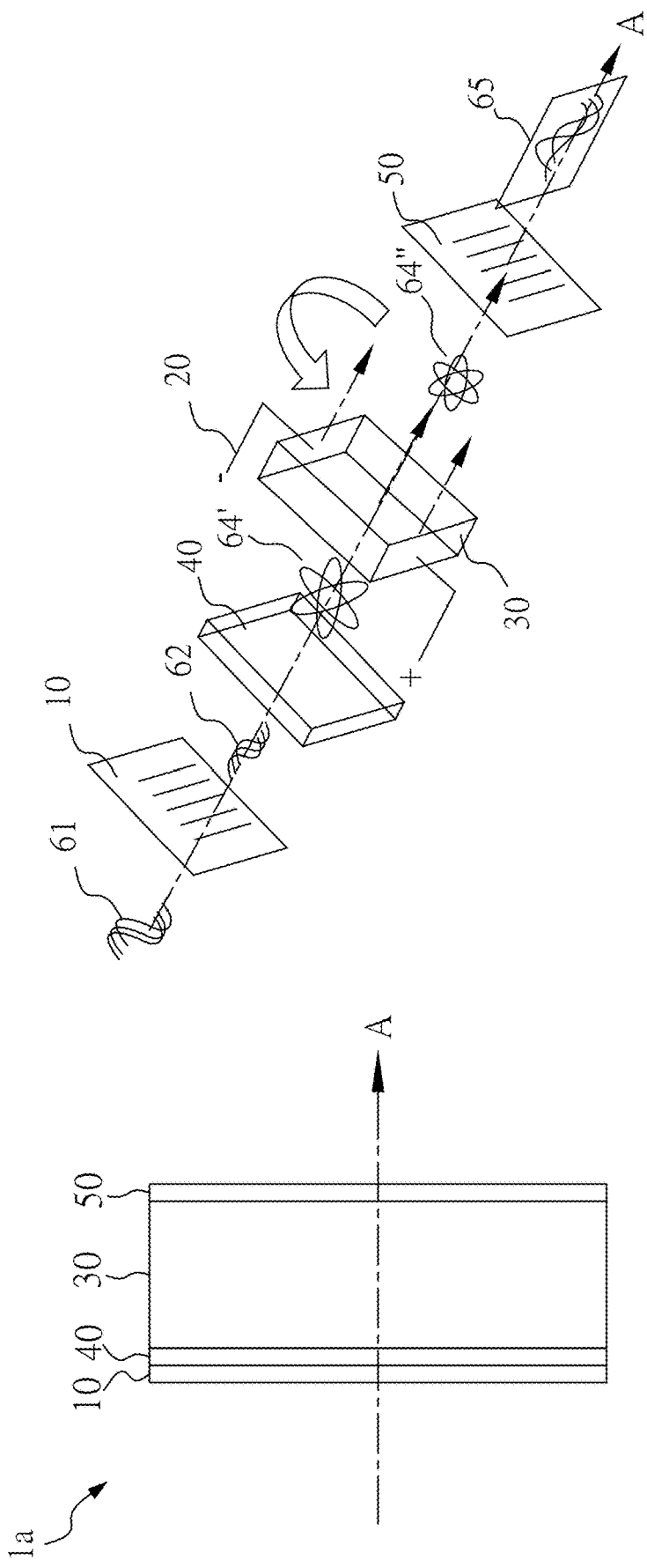

COLOR TUNABLE OPTICAL DEVICE

BACKGROUND OF THE INVENTION

Field of the Invention

The present invention relates to a color tunable optical device, and more particularly, to a color tunable optical device which uses a liquid crystal layer and a phase retarder to convert a linearly polarized light into an elliptically polarized mixed light with different wavelengths, different eccentricities and different tilt angles, and the elliptically polarized mixed light is further screened by polarizers so as to achieve color tuning effects.

Description of the Prior Art

Electrochromic sunglasses consisting of a first linear polarizer, a liquid crystal layer and a second linear polarizer are currently available. However, electrochromic sunglasses can only adjust the level of change in brightness and darkness (adjusting a light transmittance of lenses), and are incapable of adjusting the color temperature (changing the hue, saturation and lightness of the transmittant light of the lenses). The color of electrochromic sunglasses is determined during manufacturing, and so the first linear polarizer and the second linear polarizer are already fixed at predetermined angles during the manufacturing of the electrochromic sunglasses. As a result, in a finished product of the electrochromic sunglasses, an included angle between the first linear polarizer and the second linear polarizer which is constant and the hue, saturation and lightness of the transmitting light of the lenses still unchanged. In other words, the first linear polarizer and the second linear polarizer are in a state of fixed colors during the use thereof instead of being "color tunable during the use thereof". Moreover, the liquid crystal layer of the electrochromic sunglasses is applied to rotate a linear light having been polarized by the first polarizer with different angles by electrically controlling the liquid crystals, hence overcoming the issue of a fixed state of the first linear polarizer and the second linear polarizer once the manufacturing ends. Although the structure of electrochromic sunglasses has a predetermined color system from the beginning, the predetermined color system is determined by the included angle between the first linear polarizer and the second linear polarizer. However, the electrochromic sunglasses are incapable of producing any significant changes of color temperature of the transmitting light while the liquid crystals are electrically controlled, and as the intensity of the applied electric field increases, liquid crystal molecules gradually tend to align in the direction of the electric field such that the birefringence effect thereof decreases gradually, resulting in degradation of the marginal effect of color tuning. Moreover, currently there are filters that mechanically adjust the color temperature, for example, polarization filters used in cameras. Such type of filters have an arrangement structure of a linear polarizer, a wave plate and a linear polarizer, they however need to be mechanically rotated in order to achieve a color tuning effect. Thus, the mechanism of such type of filters is necessarily circular, and this limits such type of products to be applicable to only cameras. Therefore, there is a need for deeper research with respect to color tunable optical devices in the aim of expanding the application range of color tunable optical devices.

SUMMARY OF THE INVENTION

It is a primary object of the present invention to provide a color tunable optical device, which uses a liquid crystal layer and a phase retarder to convert a linearly polarized light into an elliptically polarized mixed light with different wavelengths, different eccentricities and different tilt angles, and the elliptically polarized mixed light is further screened by polarizers so as to achieve color tuning effects.

To achieve the above object, a color tunable optical device of the present invention is adapted to electrically connect to a driving power source, and includes a first polarizer, a liquid crystal layer, a phase retarder and a second polarizer. The first polarizer converts a first mixed light into a first polarized mixed light. The liquid crystal layer is located behind the first polarizer to receive the first polarized mixed light, and is electrically connected to the driving power source, which changes an alignment direction of liquid crystal cells of the liquid crystal layer. The phase retarder is located behind the liquid crystal layer to generate a second polarized mixed light. The second polarizer is located behind the phase retarder, and changes an incident angle of the second polarized mixed light incident on the second polarizer by changing the arrangement direction of the liquid crystal cells of the liquid crystal layer to generate the second mixed light, wherein a color of the second mixed light is different from that of the first mixed light.

The present invention further provides a color tunable optical device. The color tunable optical device is adapted to electrically connect to a driving power source, and includes a first polarizer, a phase retarder, a liquid crystal layer and a second polarizer. The first polarizer converts a first mixed light into a first polarized mixed light. The phase retarder is located behind the first polarizer to receive the first polarized mixed light to generate a second polarized mixed light. The liquid crystal layer is located behind the phase retarder and electrically connected to the driving power source, wherein the driving power source performs driving to change an alignment direction of liquid crystal cells of the liquid crystal layer. The second polarizer is located behind the liquid crystal layer, and changes an incident angle of the second polarized mixed light incident on the second polarizer by changing the arrangement direction of the liquid crystal cells of the liquid crystal layer to generate the second mixed light, wherein a color of the second mixed light is different from that of the first mixed light.

In the color tunable optical device of the present invention, the phase retarder is used, the mixed light in a polarized state is converted into the elliptically polarized mixed light with different wavelengths, different eccentricities and different tilt angles by changing the arrangement direction of the liquid crystal cells of the liquid crystal layer, and the elliptically polarized mixed light is further screened by polarizers, hence achieving color tuning effects. Compared to the eletrochromic sunglasses of the prior art, the present invention additionally includes a phase retarder, and the approach of changing the arrangement direction of the liquid crystal cells of the liquid crystal layer by the driving power source provides extremely apparent color changes within a controllable range of the driving power source when the tunable color optical device of the present invention is used, further at the same time eliminating the issue of gradually diminishing color changes caused by an increasing voltage of the driving power source. The operation and the shape of the mechanism of the present invention are completely free from any constraints of geometric shapes. The tunable color optical device of the present invention is applicable to device that need optical color tuning such as glasses lenses, billboards, windows, screens and accessories, expanding the applicable range of tunable color optical devices, and solving the issues of an overly limited application range of electrically-controlled sunglasses or polarization filters of the prior art.

BRIEF DESCRIPTION OF THE DRAWINGS

FIG. 3A is a schematic diagram a polarized mixed light of the present invention.

FIG. 3B is a schematic diagram a second mixed light of the present invention.

FIG. 3C is a schematic diagram of an incident included angle between a polarization plane of a linearly polarized light and a phase retarder.

FIG. 4 is an assembly schematic diagram of a color tunable optical device according to a second embodiment of the present invention.

FIG. 5 is an exploded schematic diagram of the color tunable optical device according to the second embodiment of the present invention.

DETAILED DESCRIPTION OF THE EMBODIMENTS

Figures 1, 2:
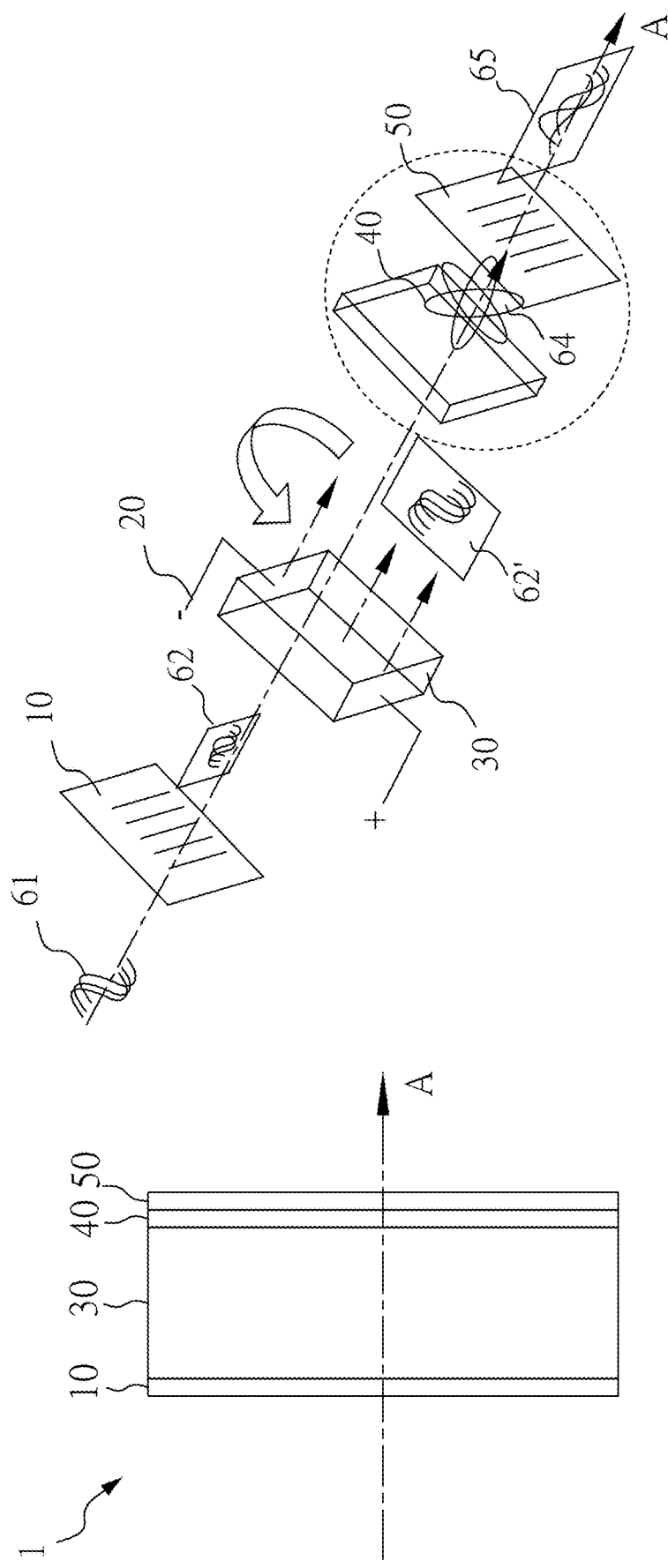
FIG. 1 is an assembly schematic diagram of a color tunable optical device according to a first embodiment of the present invention.
FIG. 2 is an exploded schematic diagram of the color tunable optical device according to the first embodiment of the present invention.

Preferred specific embodiments are given below to better understand the technical contents of the present invention. Refer to FIG. 1, FIG. 3 and FIG. 3A to FIG. 3C showing an assembly schematic diagram and an exploded schematic diagram of a color tunable optical device according to a first embodiment of the present invention, schematic diagrams of a polarized mixed light and a second mixed light of the present invention, and a schematic diagram of an incident included angle between a polarization plane of a linearly polarized light and a phase retarder.

As shown in FIG. 1 and FIG. 2, in the first embodiment of the present invention, a color tunable optical device 1 is adapted to electrically connect to a driving power source 20, and includes a first polarizer 10, a liquid crystal layer 30, a phase retarder 40 and a second polarizer 50 sequentially along a light transmission direction A. The first polarizer 10 converts a first mixed light 61 into a first polarized mixed light 62. In this embodiment, the color tunable optical device 1 of the present invention may be a glasses lens, an optical advertisement billboard, a billboard, a window, a screen or an accessory. The first polarizer 10 is a linear polarizer, and the first mixed light 61 may be a white light or a visible light with a continuous spectrum. That is to say, the first mixed light 61 includes lights with a plurality of wavelengths; however, the present invention is not limited to the examples above, provided that the first mixed light 61 at least includes a visible light of two different frequencies. As shown in FIG. 3A, the first mixed light 61 is converted into the first polarized mixed light 62 by the first polarizer 10. Since the first polarizer 10 of this embodiment is a liner polarizer, the first polarized mixed light 62 of this embodiment is a linearly polarized mixed light, that is, a planar projection the first polarized mixed light 62 along the light transmission direction is a straight line.

As shown in FIG. 1 and FIG. 2, in the first embodiment, the liquid crystal layer 30 is located behind the first polarizer 10, and receives the first polarized mixed light 62 to generate a first polarized mixed light 62'. Moreover, the liquid crystal layer 30 is electrically connected to the driving power source 20, which performs driving to change an arrangement direction of liquid crystal cells of the liquid crystal layer 30. In this embodiment, the phase retarder 40 is a wave plate and is located behind the liquid crystal layer 30, and receives the first polarized mixed light 62' to generate a second polarized mixed light 64. The second polarizer 50 is a linear polarizer and is located behind the phase retarder 40, and changes, by changing the arrangement direction of the liquid crystal cells of the liquid crystal layer 30, an incident angle of the first polarized mixed lights 62 and 62' incident on the phase retarder 40 to generate a second polarized mixed light 64. The second polarized mixed light 64 is an elliptically polarized mixed light with different eccentricities and different tilt angles, and is screened by the second polarizer 50 so that a second mixed light 65 becomes a linearly polarized mixed light with different intensities. More specifically, the second polarized mixed light 64 (the elliptically polarized mixed light) is screened and divided by the second polarizer 50, and is again converted back into a linearly polarized mixed light (the second mixed light 65). At this point, because of the intensity distribution ratio of component light of the second polarizer 50 in the polarization direction is different from that of the first mixed light 61, in other words, a color change is produced, the second mixed light 64 and the first mixed light 61 contain a color temperature difference in between, hence achieving a color tuning optical effect.

With the combination of the first polarizer 10 and the phase retarder 40, the first mixed light 61 is converted into the second polarized mixed light 64 (the elliptically polarized mixed light). Because the first polarized mixed light 62 includes linearly polarized lights with a plurality of wavelengths, the second polarized mixed light 64 (the elliptically polarized mixed light) with a plurality of eccentricities is formed after the effect of the phase retarder 40. More specifically, referring to FIG. 3A to FIG. 3C, by changing the arrangement direction of the liquid crystal cells of the crystal layer 30, the incident angle of the linear polarization plane 621 of the first polarized mixed light 62 incident on the phase retarder 40 is controlled. That is, by controlling intersection angles of the linear polarization plane 621 of the first polarized mixed light 62 with respect to a fast axis B and a slow axis C, the eccentricity of an ellipsoid is changed so as to form the second polarized mixed light 64 with a plurality of eccentricities (the elliptically polarized mixed light). Moreover, a polarization component in the same direction as the second polarizer 50 in the second polarized mixed light 64 (the elliptically polarized mixed light) is selected by the second polarizer 50. At this point, the second polarized mixed light (the elliptically polarized mixed light) with different eccentricities is screened by the polarization direction of the second polarizer 50 into a linearly polarized mixed light with different intensities, and this linearly polarized mixed light with different intensities is then the second mixed light 65 of the present invention. Thus, the intensity distribution of the original first mixed light 61 is changed, achieving the color tuning effect.

It should be noted that, the phase retarder 40 may be a wave plate, a quarter-wave plate or a half-wave plate. The term "quarter" of the quarter-wave plate means, for a slow-axis component with a predetermined wavelength (as shown in FIG. 3), the quarter-wave plate retards the phase of the predetermined wavelength by a quarter wavelength. Given that this condition is established, referring to FIG. 3C showing an intersection line D formed by the linear polarization plane 621 and the phase retarder 40, when the linear polarization plane 621 is incident along the fast axis and slow axis at an included angle θ of 45 degrees, an outgoing light can form a special case of elliptical polarization, that is, a circularly polarized light. Elliptically polarized lights are formed for other incident angles. Hence, it is known that, if the wavelength of the incident light is not a predetermined wavelength and does not correspond to the predetermined wavelength of the quarter-wave plate, elliptical polarization is still formed. In fact, the phase retarder 40 may be any desired wave plate, which is capable of achieving the effect of converting the linearly polarized light into elliptical polarization as described above. The reasons behind is that, for both a half-wave plate and a quarter-wave plate, only the phase of a light with one single predetermined wavelength in a mixed light is delayed by a quarter wavelength, and the remaining light in the mixed light that does not corresponding to the predetermined one single wavelength is still converted into elliptically polarization.

Examples are given here to describe the above principle. It is assumed that the first mixed light 61 is an ambient incident visible light ranging between 350 nm and 800 nm. In the first example, when a quarter-wave plate with respect to a wavelength of 500 nm is used, the quarter-wave plate with respect to a wavelength of 500 nm converts only the light with a wavelength of 500 nm to a circularly polarized light because the wavelength perfectly corresponds to the quarter-wave plate, while the component lights with other wavelengths in the first mixed light 61 can mostly form elliptically polarization with different eccentricities and different tilt angles (because the quarter-wave plate only perfectly corresponds to the light with a wavelength of 500 nm), hence achieving a color changing effect. In the second example, when a half-wave plate with respect to a wavelength of 600 nm is used, except for the visible light with a wavelength of 600 nm that cannot be converted to elliptical polarization, the wavelengths of component lights with other wavelengths (for example, 590 nm, 580 nm and 610 nm) in the first mixed light 61 do not perfectly correspond to the corresponding half-wave plate with respect to the half-wave plate. Therefore, it is similarly proven that, in this case, most component lights in the first mixed light 61 can still form an elliptical polarized light with different eccentricities and different tilt angles, hence achieving the color changing effect. In other words, the spirit of color tuning of the color tunable optical device 1 of the present invention uses different rotation angles of the arrangement direction of the liquid crystal cells of the liquid crystal layer 30 to change the angle of the polarization plane of the first polarized mixed light 62 (the linearly polarized light) incident on the phase retarder 40, thereby converting the first polarized mixed light 62 into the second polarized mixed light 64 (the elliptically polarized mixed light) with different eccentricities and different tilt angles, and the polarization direction of the second polarizer 50 is used to screen the linearly polarized mixed light (the second mixed light 65) with different intensities. To sum up, the present invention to provide a color tunable optical device 1 applying a liquid crystal layer 30 and a phase retarder 40 to convert a mixed linearly polarized light into a mixed elliptically polarized light with different eccentricities and different tilt angles. The intensity of each wavelength of elliptically polarized mixed light is further reduced in different levels by the second polarizer 50 so as to achieve color tuning effects, especially in color temperature tuning effect.

For the description below, again refer to FIG. 3A to FIG. 3C as well as FIG. 4 and FIG. 5 showing an assembly schematic diagram and an exploded schematic diagram of a color tunable optical device according to second embodiment of the present invention.

As shown in FIG. 4 and FIG. 5, in the second embodiment of the present invention, a color tunable optical device 1a is adapted to electrically connect to a driving power source 20, and includes a first polarizer 10, a phase retarder 40, a liquid crystal layer 30 and a second polarizer 50 sequentially along a light transmission direction A. The first polarizer 10 converts a first mixed light 61 into a first polarized mixed light 62. In this embodiment, the first polarizer 10 is a linear polarizer, and the first mixed light 61 may be a white light or a visible light with a continuous spectrum. That is to say, the first mixed light 61 includes lights with a plurality of wavelengths; however, the present invention is not limited to the examples above, provided that the first mixed light 61 at least includes a visible light of two different frequencies. As shown in FIG. 3A, the first mixed light 61 is converted into the first polarized mixed light 62 by the first polarizer 10. Since the first polarizer 10 of this embodiment is a liner polarizer, the first polarized mixed light 62 of this embodiment is a linearly polarized mixed light; that is, a planar projection the first polarized mixed light 62 along the light transmission direction is a straight line.

In this embodiment, as shown in FIG. 4 and FIG. 5, the phase retarder 40 of this embodiment may be a wave plate, a quarter-wave plate or a half-wave plate. The phase retarder 40 is located behind the first polarizer 10 to receive the first polarized mixed light 62 to generate a second polarized mixed light 64' (elliptically polarized mixed light). The liquid crystal layer 30 is located behind the phase retarder 40, and receives the second polarized mixed light 64' (the elliptically polarized mixed light) to generate a second polarized mixed light 64" (the elliptically polarized mixed light), which is an elliptically polarized mixed light with different eccentricities and different tilt angles. The liquid crystal layer 30 is electrically connected to a driving power source 20, which performs driving to change an arrangement direction of liquid crystal cells of the liquid crystal layer 30. The second polarizer 50 is located behind the liquid crystal layer 30 to turn a tilt angle of the second polarized mixed light 64" (the elliptically polarized mixed light) by changing the arrangement direction of the liquid crystal cells of the crystal layer 30. The second polarized mixed light 64" (elliptically polarized mixed light) is then screened by the second polarizer 50 to generate the second mixed light 65, which is a linearly polarized mixed light with different intensities. More specifically, the elliptically polarized mixed light with different eccentricities and different tilt angles included in the second polarized mixed light 64" (the elliptically polarized mixed light) is screened and divided by the second polarizer 50, and is again converted back into a linearly polarized mixed light (the second mixed light 65). At this point, because the intensity distribution ratio of component light of the second polarizer 50 in the polarization direction is different from that of the first mixed light 61, in other words, a color change is produced, the second mixed light 64 and the first mixed light 61 contain a color temperature difference in between, hence achieving a color tuning optical effect.

In the color tunable optical devices 1 and 1a of the present invention, the phase retarder 40 is used and the liquid crystal layer 30 is applied to turn the angle of the elliptically polarized mixed light with different eccentricities and different tilt angles incident on the second polarizer 50 by changing the arrangement direction of the liquid crystal cells of the liquid crystal layer 30, so as to achieve a color tuning optical effect by such screening; i.e the intensity of each wavelength of elliptically polarized mixed light would be further reduced in different levels by the second polarizer 50. Thus, the color range within the controllable range of the driving power source 20 is very apparent during the use of the color tunable optical devices 1 and 1a of the present invention, eliminating the issue of gradually diminishing color changes caused by an increasing voltage of the driving power source. The operation and the shape of the mechanism of the color tunable optical devices 1 and 1a of the present invention are completely free from any constraints of geometric shapes. The tunable color optical device of the present invention is applicable to devices that need optical color tuning such as glasses lenses, billboards, windows, screens and accessories, expanding the applicable range of tunable color optical devices, and solving the issues of an overly limited application range of electrically-controlled sunglasses or polarization filters of the prior art.

It should be noted that, the embodiments given above are examples for better illustrating the present invention, and the scope of claims asserted by the present invention are not to be limited by the embodiments above but are to be accorded with the appended claims.

What is claimed is:

1. A color tunable optical device adapted to electrically connect to a driving power source, the color tunable optical device comprising:
   a first linear polarizer converting a first mixed light into a first linear polarized mixed light;
   a liquid crystal layer located behind the first linear polarizer to receive the first linear polarized mixed light and electrically connected to the driving power source, the driving power source performing driving to change an arrangement direction of liquid crystal cells of the liquid crystal layer;
   a phase retarder located behind the liquid crystal layer to generate an elliptically polarized mixed light with different eccentricities and different tilt angles; and
   a second linear polarizer located behind the phase retarder and by changing the arrangement direction of the liquid crystal cells of the liquid crystal layer, an incident angle of the elliptically polarized mixed light with different eccentricities and different tilt angles incident on the second polarizer can be changed consequently and then the second linear polarizer screens the elliptically polarized mixed light with different eccentricities and different tilt angles to generate a second linearly polarized mixed light with different intensities, wherein due to an intensity distribution of the second linearly polarized mixed light is different from that of the first linear mixed light, a color tuning effect is achieved.

2. The color tunable optical device according to claim 1, wherein the phase retarder is a wave plate.

3. A color tunable optical device adapted to electrically connect to a driving power source, the color tunable optical device comprising:
   a first linear polarizer converting a first mixed light into a first linear polarized mixed light;
   a phase retarder located behind the first linear polarizer to receive the first linear polarized mixed light to generate an elliptically polarized mixed light with different eccentricities and different tilt angles;
   a liquid crystal layer located behind the phase retarder and electrically connected to the driving power source, the driving power source performing driving to change an arrangement direction of liquid crystal cells of the liquid crystal layer;
   a second linear polarizer located behind the liquid crystal layer and by changing the arrangement direction of the liquid crystal cells of the liquid crystal layer, an incident angle of the elliptically polarized mixed light with different eccentricities and different tilt angles incident on the second polarizer can be changed consequently and then the second linear polarizer screens the elliptically polarized mixed light with different eccentricities and different tilt angles to generate a second linearly polarized mixed light with different intensities, wherein due to an intensity distribution of the second linearly polarized mixed light is different from that of the first linear mixed light, a color tuning effect is achieved.

4. The color tunable optical device according to claim 3, wherein the phase retarder is a wave plate.

\* \* \* \* \*